(12) United States Patent
Patton et al.

(10) Patent No.: US 6,972,859 B1
(45) Date of Patent: Dec. 6, 2005

(54) AUTHORIZING THE PRINTING OF DIGITAL IMAGES

(75) Inventors: David L. Patton, Webster, NY (US); Gustavo R. Paz-Pujalt, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 403 days.

(21) Appl. No.: 09/359,152

(22) Filed: Jul. 22, 1999

(51) Int. Cl.$^7$ .............................................. G06F 15/00
(52) U.S. Cl. .................. 358/1.15; 358/1.14; 358/1.16; 705/40; 396/310
(58) Field of Search .............................. 358/1.15, 1.16; 705/40; 355/40; 396/310

(56) References Cited

U.S. PATENT DOCUMENTS

| | | |
|---|---|---|
| 5,666,215 A | 9/1997 | Fredlund et al. |
| 5,799,219 A * | 8/1998 | Moghadam et al. ........ 396/319 |
| 5,873,605 A | 2/1999 | Kaplan |
| 5,974,401 A | 10/1999 | Enomoto et al. |

FOREIGN PATENT DOCUMENTS

| | | |
|---|---|---|
| EP | 0893787 | 1/1999 |
| WO | WO 97/04353 | 2/1997 |
| WO | WO 00/22811 | 4/2000 |

* cited by examiner

Primary Examiner—Twyler Lamb
(74) Attorney, Agent, or Firm—Raymond L. Owens

(57) ABSTRACT

A method of authorizing the making of images on a receiver such as postage stamps by a receiving agency includes electronically transmitting a digital image file over a channel to the receiving agency and the digital image file includes at least one digital image and authorization information for making images on a receiver. The method further includes receiving the digital image file at the receiving agency, displaying at least one received digital image and examining the displayed digital image to determine whether its contents are acceptable for making images and examining the authorization information and printing at a designated location accepted digital images on a receiver corresponding to the transmitted digital image when the authorization information is approved.

5 Claims, 6 Drawing Sheets

AUTHORIZING THE PRINTING OF DIGITAL IMAGES

FIELD OF THE INVENTION

This invention relates to electronically transmitting a digital image over a channel to the receiving agency and authorizing such image to be printed such as on a postage stamp.

BACKGROUND OF THE INVENTION

Photographic images have been viewed at a consumer's location or a personal computer and images have been selected for initial printing, reprinting and ordering related image services.

Photographic negatives are provided to a scanner to obtain image data. The image data is manipulated to provide a positive image in the case of the photographic negatives and sent to the consumer's personal computer. The desired images are then selected and order information is provided, based on the positive image as displayed on the display of the personal computer. The order information is recorded to permit the desired prints and services to be created and the resulting order is sent to the addressee. The following can also be used as sources of images to be selected for prints and other services; image files stored in digital format on floppy disks, Picture CDs, Photo CDs, CD-ROMs, down loaded from the Internet, and negatives and prints scanned using the consumer's own scanner and displayed on their personal computer's display.

Services selected using the chosen images are used in a number of different applications. In one of those applications, so-called "sticker prints" are made on a print media having an adhesive base and arranged so that they can be peeled off and individually pasted onto another surface. However, these stickers are not used in situations, which require that they be "authentic" such as postage stamps. By use of the term "authentic" is meant that the image can indicate to a viewer or a reader with a high degree of certainty that the image has not been counterfeited.

Currently the postage stamps are printed using a Gravure process. The Gravure process is capable of creating images of very high resolution, we beyond the capabilities of most common printers. The Gravure process is an intaglio process. It uses a depressed or sunken surface etched into a copper cylinder to create the image and the unetched surface of the cylinder represent non-printing areas. The cylinder rotates in a bath of ink and the etched area p up the ink and transfers it to the media creating the image. Gravure printing is considered excellent for printing highly detailed marks or pictures. High cylinder making expense usually limits Gravure to long runs.

The process described above for printing stamps does not lend itself to printing small batches of stamps in the quantities of 10 to 1000. This prohibits a consumer from choosing and image and having a postage stamp created using that image. A second problem is that not every personal image is suitable for use as a postage stamp. That is to say some personal images might be offensive in nature.

U.S. Pat. No. 5,873,605, discloses creating a postage stamp using an electronic camera to capture an image of oneself via a vending machine. Likewise in European Patent Application EP 0 893 787, Basington et. al., disclose producing a postage stamp using an electronic camera and a vending machine. There are several problems that are not addressed using these methods. The first problem is the user must go to the vending machine to produce the stamp. The second is that there is no method described for checking the content of the image to insure that the image captured is not offensive in nature making it unsuitable for use as a stamp. The third problem is it does not permit for creating a stamp from an image from other digital sources such as a file, print, negative, Photo CD, CD-ROM, or DVD.

SUMMARY OF THE INVENTION

It is an object of the present invention to provide a method of authorizing the making of images on a receiver such as postage stamps by a receiving agency comprising the steps of:
  (a) electronically transmitting a digital image file over a channel to the receiving agency;
  (b) the digital image file includes at least one digital image and authorization information for making images on a receiver; and
  (c) receiving the digital image file at the receiving agency, displaying at least one received digital image and examining the displayed digital image to determine whether its contents are acceptable for making images and examining the authorization information and printing at a designated location accepted digital images on a receiver corresponding to the transmitted digital image when the authorization information is approved.

By electronically transmitting a digital image and authorization information for making images on a receiver over a channel to the receiving agency, where the receiving agency examines the transmitted digital image and authorization information to determine whether it is acceptable for making images. When the receiving agency determines the digital image is acceptable and the authorization information is approved, the receiving agency prints the image on a receiver.

It is a feature of the present invention wherein the transmitted digital image is converted by a display to a visual image, which is viewed to determine if the image is acceptable.

It is another feature of the present invention wherein the authorization information is examined by logic and control means to determine that whether or not the authorization information is approved.

It is another feature of the present invention wherein a thermal printer, electrophotographic printer, ink jet or digital photographic printer prints the images.

It is a further feature of the present invention wherein the image and the authorization information is transmitted over the Internet.

It is an additional feature of the present invention wherein the image and the authorization information is delivered to the receiving agency via a courier service such as the U.S. Postal Service or Federal Express in a hardcopy form.

Still another feature of the present invention wherein the printed image in the form of a stamp is returned to the requesting consumer via the U.S. Postal Service or courier service such as Federal Express.

BRIEF DESCRIPTION OF THE DRAWINGS

FIG. 1A is an enlarged view of the selected image of FIG. 1;

FIG. 1B is an enlarged view of the authenticated image of FIG. 2

DETAILED DESCRIPTION OF THE PREFERRED EMBODIMENTS

Figure 1:
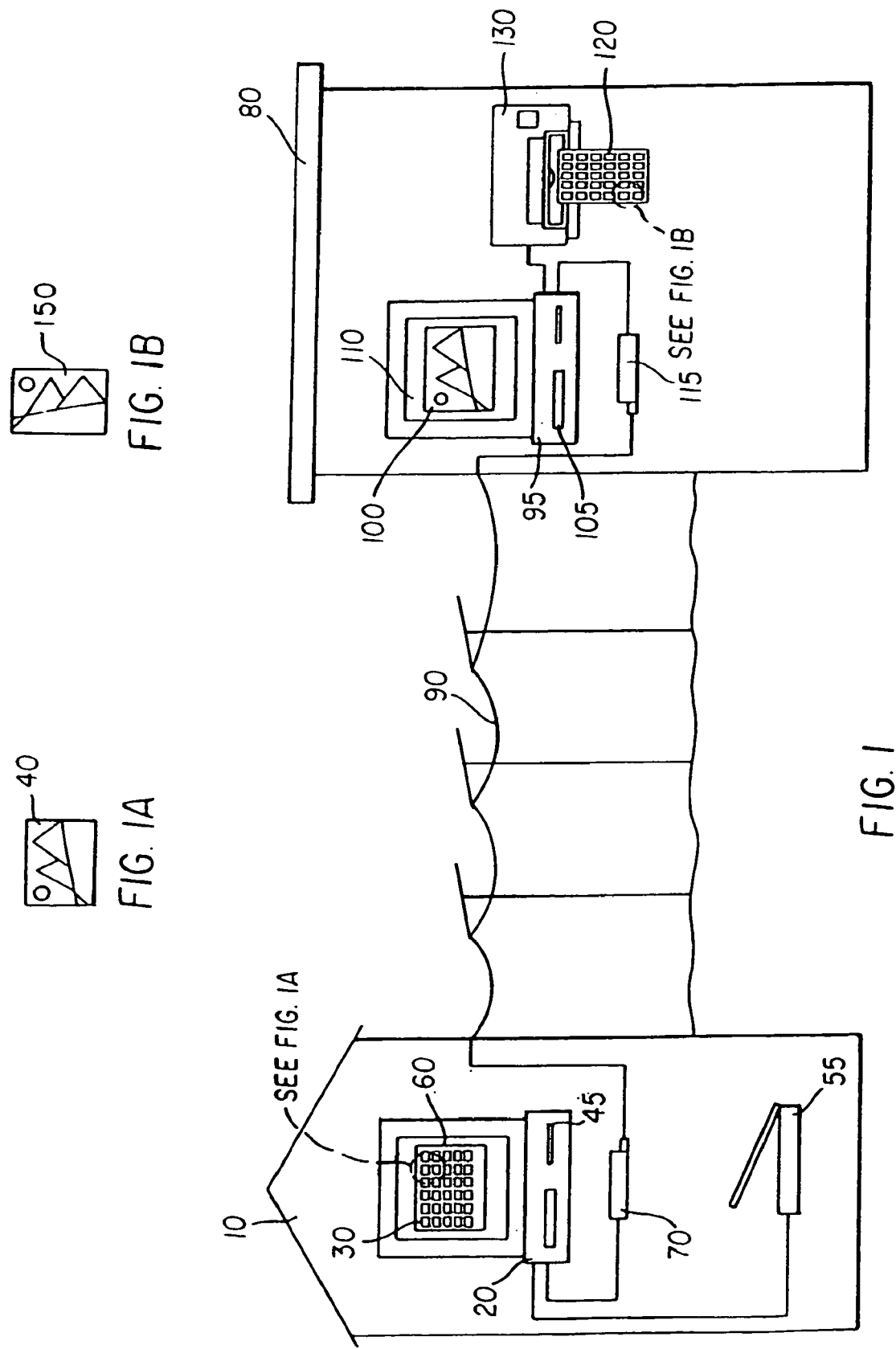
FIG. 1 is a block diagram of a system for remotely selecting images and transmitting a digital file of the selected image to a receiving agency such as for the production of postage stamps.

Referring now to FIG. 1, there is illustrated a system for remotely selecting an image and ordering postage stamps according to the present invention. Reference is made to commonly assigned U.S. Pat. No. 5,666,215 the disclosure of which is incorporated herein by reference. A set of personal images 30 is viewed at a consumer's location 10 on their personal computer 20 or interactive TV. The source of the set 30 of the personal images can be image files stored in digital format on floppy and hard disks, Picture CDs, Photo CDs, and CD-ROMs. The image files can be down loaded from the Internet using a system such as Kodak's PhotoNet, or negatives and prints can be scanned using the consumer's own film scanner 45 or print scanner 55 and displayed on their personal computer's display 60. The desired image 40 is then selected and authorizing information such as order information is provided. The authorizing information is comprised of but not limited to the consumer's address, credit card number, consumer authorization and number of postage stamps desired. A digital file of the selected image 40 (FIG. 1A) and the authorizing information are sent via a modem 70 to the receiving agency 80 such as the U.S. Postal Service over communication links 90 such as the Internet. The receiving agency 80 receives the image file and authorizing information via a modem 1115, records the image file and authorizing information using a computer 95, and stores the image file and authorizing information in a mass storage unit 105 such as an IOMEGA Jaz Drive.

Figure 5:
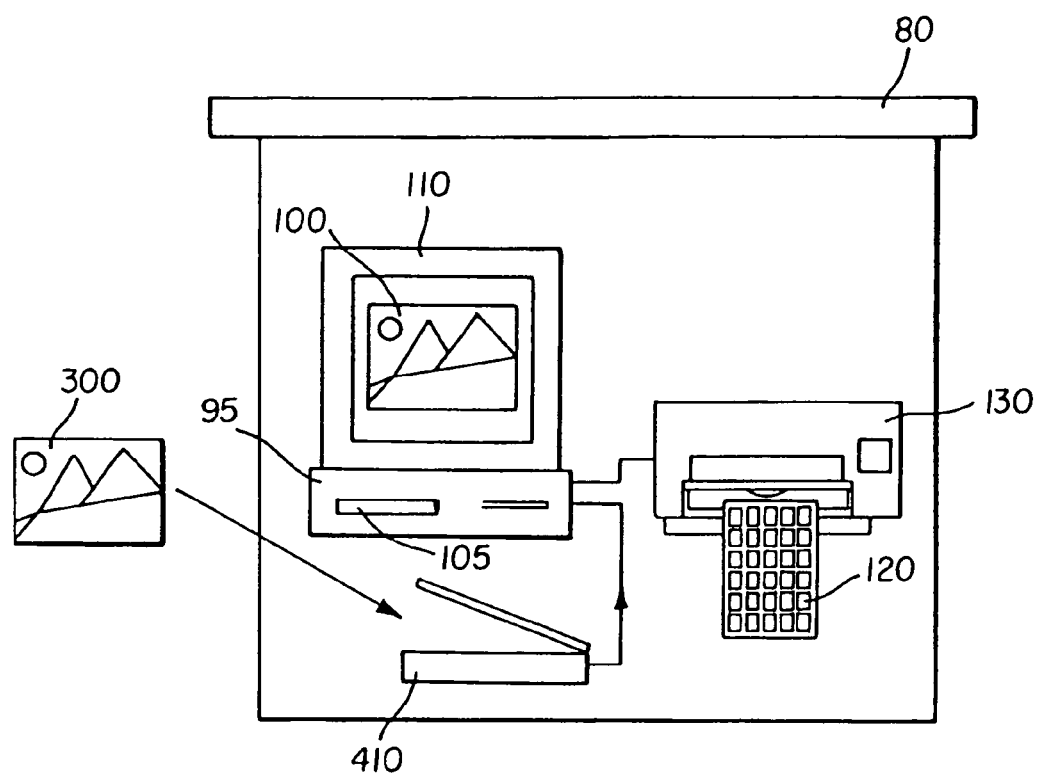
FIG. 5 is a block diagram of a system for sending an image via a courier to receiving agency such as for the production of postage stamps.

As illustrated in FIG. 5, the consumer sends a hardcopy 400 of the image 40 and authorizing information such as order information to the receiving agency 80 via a carrier such as the U.S. Postal Service, Federal Express, or DHL. The authoring agency receives the hardcopy image 400, scans the hard copy image 400 and the authoring information using a scanner 410 such as an Epson ES-1200C, records an image file including authorizing information using a computer 95, and stores the digital file in a mass storage unit 105 such as an IOMEGA Jaz Drive.

Referring again to FIG. 1, the receiving agency 80 checks the received image file by viewing the received image 100 and the authorizing information on a monitor 110 and authorizes the requested number of personalized stamps 120 to be produced and sent to the addressee. The personalized stamps 120 are produced using a thermal printer 130 such as a KODAK PS 8650 Color Printer or a KODAK Photo Printer 4700. Other types of digital printers such as a KODAK CRT Digital Color Printer, a Hewlett Packard Deskjet 870Cix Inkjet Printer, or a digital electrophotographic printer such as an Indigo-E-1000 can be used to produce the personalized stamps 120. Methods for producing authenticated images are disclosed in commonly assigned U.S. patent application Ser. No. 09/103,019, filed Jun. 23, 1998, entitled "Forming Authenticated Images In A Receiver"; Paz-Pujalt et, al. and U.S. patent application Ser. No. 09/165,066, filed Oct. 2, 1998, entitled "Receiver Having Authenticated Marks"; Paz-Pujalt et, al, the disclosures of which are incorporated herein by reference.

Figure 2:
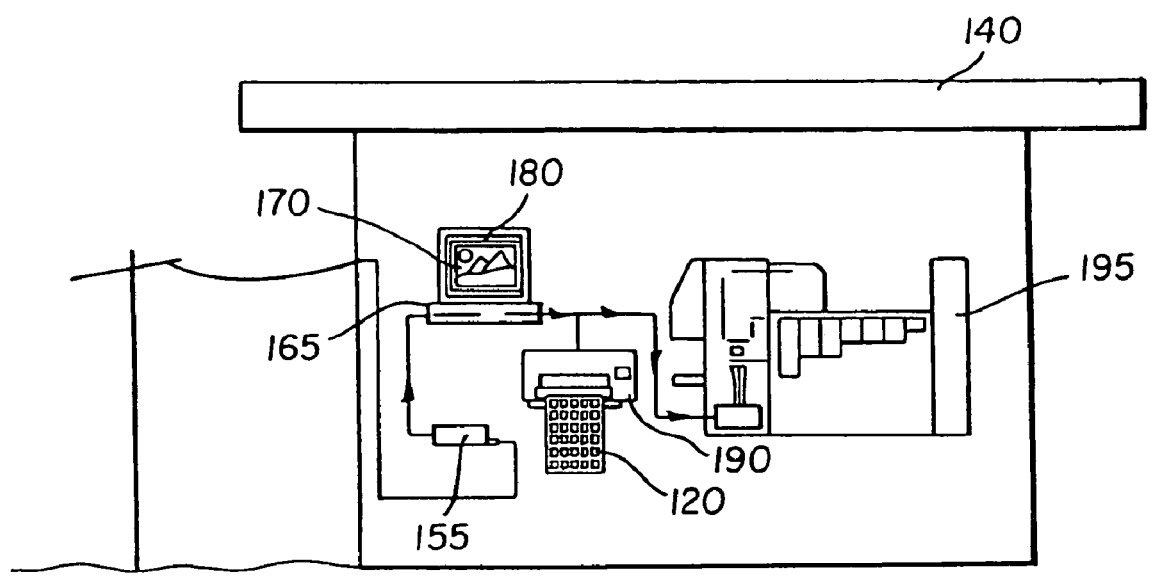
FIG. 2 is a block diagram of a system for remotely selecting images for transmitting to, receiving at a location different than the receiving agency of FIG. 1.

FIG. 2 is a block diagram of a system for remotely selecting images for transmitting to, receiving at a location different than the receiving agency for the production of such items as personalized postage stamps 120. The receiving location 140 can be a photofinisher, or any place capable of receiving, authorizing and printing an authentic digital image 150 (FIG. 1B) such as a postage stamp. A digital file of the desired image 40 and authorizing information are sent via a modem 70 (See FIG. 1) to the receiving location 140 over communication links 90 such as the Internet. The receiving location 140 receives the image file and authorizing information via a modem 155, records the image file and authorizing information using a computer 295, and stores the image file and authorizing information in a mass storage unit 165 such as an IOMEGA Jaz Drive.

Figure 6:
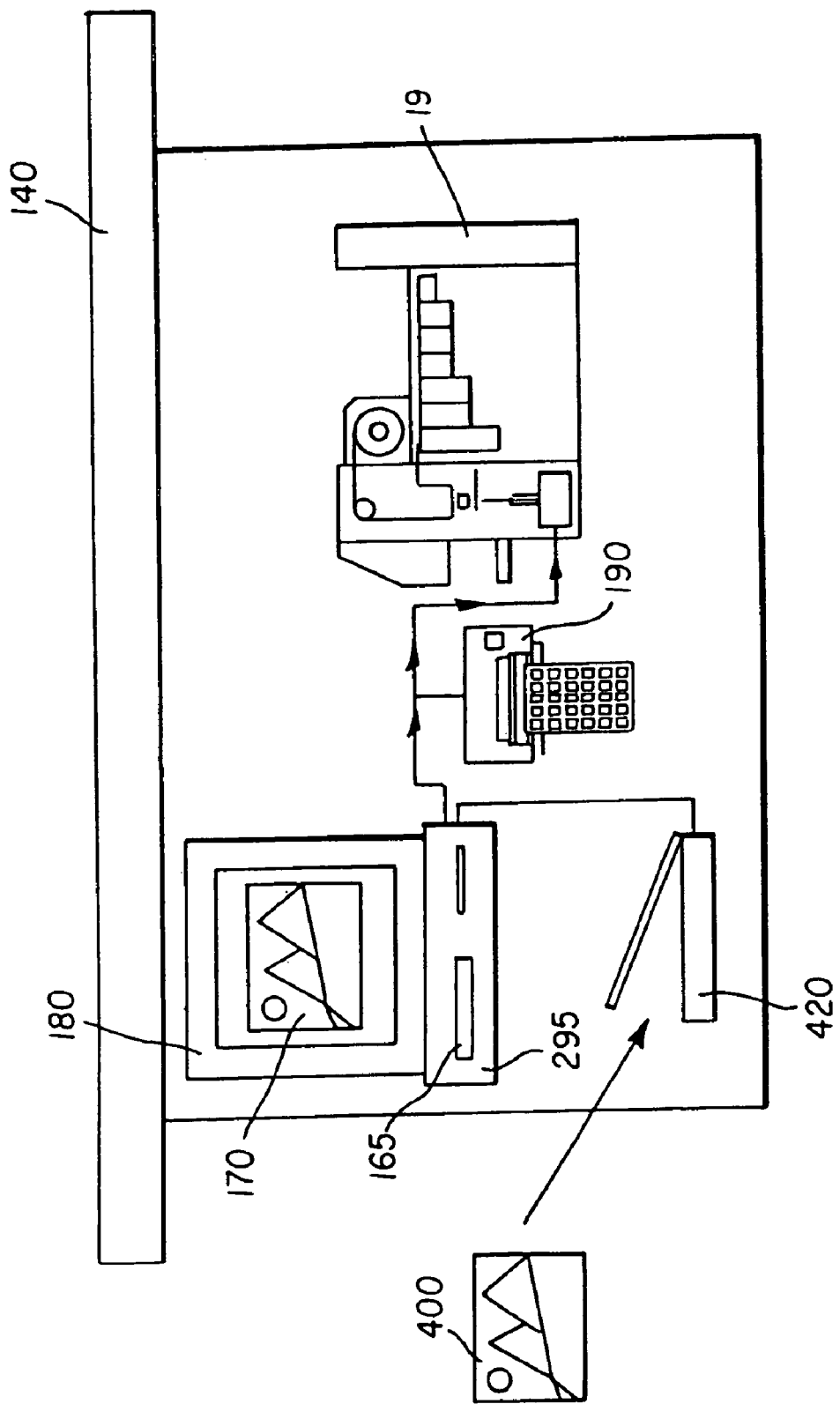
FIG. 6 is a block diagram of a system for sending an image via a courier to, receiving at a location different than the receiving agency of FIG. 5.

As illustrated in FIG. 6, the consumer can send a hardcopy 400 of the image 40 and authorizing information 230 to the receiving location 140 via a carrier such as the U.S. Postal Service, Federal Express, or DHL. The receiving location receives the hardcopy image 400 and authorizing information 230, scans the hard copy image 400 and authorizing information 230 using a scanner 420 such as an Epson ES-1200C, records the image file and authorizing information 230 using a computer 295, and stores the image file and authorizing information in a mass storage unit 165 such as an IOMEGA Jaz Drive.

Referring again to FIG. 2, the receiving location 140 checks the received image file by viewing the received image 170 and the authorizing information on a monitor 180 and authorizes the requested number of personalized stamps 120 to be produced and sent to the addressee. The personalized stamps 120 are produced using a thermal printer 190 or on a digital minilab 195 such as a Gretag Imaging Masterlab 740 Digital with Kodak Digital Printer. The postage stamps may also be printed using a digital color printer such as Xeikon D CP-1.

Figure 3:
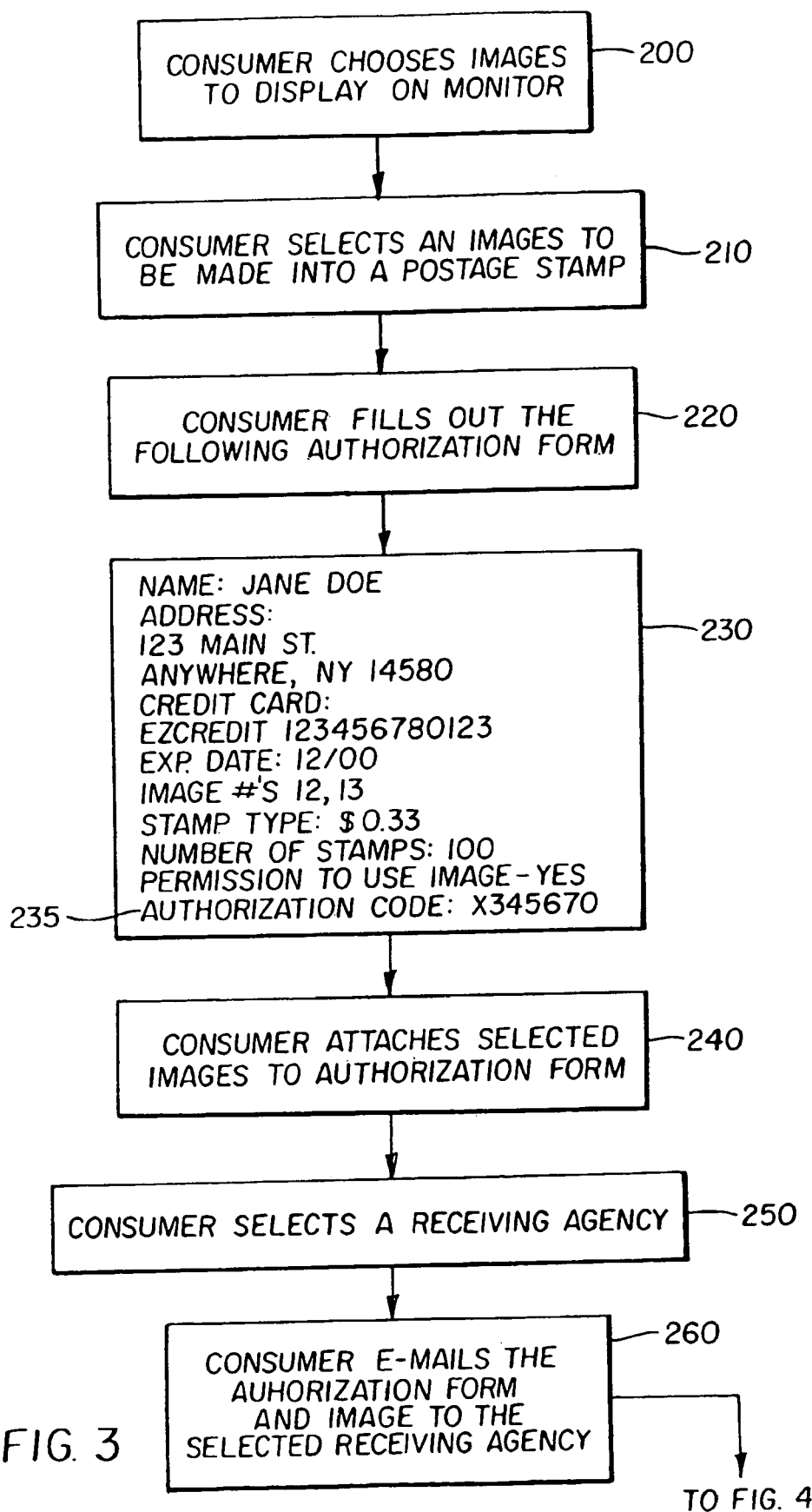
FIG. 3 is a flow chart showing how images are selected and a digital file of the selected image is transmitted to the receiving agency.

Now referring to FIG. 3, there is provided a flow chart showing how the consumer selects an image and sends a digital file of the selected image and authorizing information over the communication links 90 to the receiving agency 250. The consumer chooses the images from the image files to be displayed 200. The consumer selects 210 a desired image 40 from the display 60. The consumer then completes 220 the authorizing form 230. The authorizing form 230 contains an authorization code 235. Both the consumer and the receiving agency 250 can use the authorization code 235 to insure the image received by the receiving agency 250 did come from and belong to the consumer requesting the postage stamps. The authorization code 235 can be linked to the consumer's credit card number similarly to the way a pin number is linked to a credit card and is well known in the art. The linking of the authorization code 235 to the consumer's credit card number can be done for added security but is not necessary. The authorization code 235 can also be used by receiving agency 250 as a customer order number for identifying and track an order. The receiving agency 250 can also use the authorization code 235 to inform the consumer the image selected is suitable for use as a postage stamp and the postage stamps will be produced and sent to the consumer. The consumer electronically attaches the image file of the selected image to the authorizing form file, 240, chooses a receiving agency 250 either 80 (FIG. 1) or 140 (FIG. 2) and e-mails both files to the selected receiving agency 260.

Figure 4:
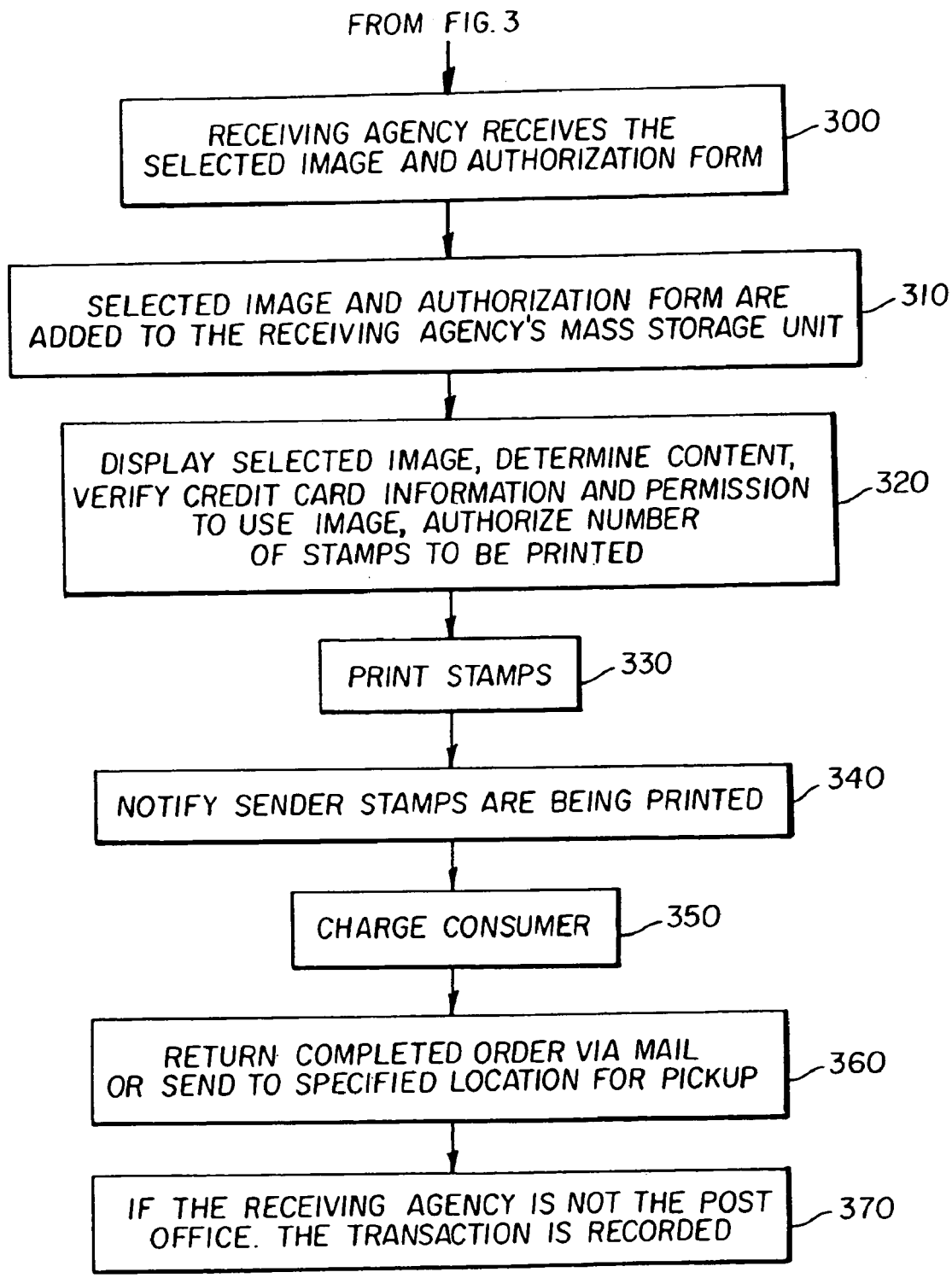
FIG. 4 is a flow chart continuing the flow chart of FIG. 3 showing how selected images are authorized and produced from the digital file and sent to the requesting consumer.

Now referring FIG. 4, which continues the flow chart of FIG. 3 and shows how selected images are authorized and produced from the digital and returned to the requesting consumer. The receiving agency 250 receives the file of the selected image and authorizing form file 300. The files are added to the receiving agency's mass storage unit 310. The selected image is displayed, determined for suitability of image content, the authorizing information is entered, the consumer's credit card is verified, and authorization is given to produce the postage stamps and complete the order 320 when the image content is acceptable and the authorization is approved. The postage stamps are printed 330. After the image has been viewed and authorization to produce the postage stamps given, the receiving agency can choose to notify the consumer that the order is being fulfilled 340. The receiving agency charges the consumer's credit card 350 and the completed order are sent to the consumer's address 360 or to any other consumer designated location for retrieval. If the receiving agency is not the post office, but an agent, the postage stamp transaction 370 is recorded to that the collect revenues can be distributed.

It will be understood the present invention is not limited to the printing of postage stamps but in equally applicable to the printing of traveler's checks, money orders. Gift certificates, or the like.

The invention has been described in detail with particular reference to certain preferred embodiments thereof, but it will be understood that variations and modifications can be effected within the spirit and scope of the invention.

PARTS LIST

10 consumer location
20 personal computer
30 personal images
40 desired images
55 scanner
60 display
70 modem
80 receiving agency
90 communication link
100 received image
105 mass storage unit
110 monitor
115 modem
120 personalized images
130 printer
140 receiving locations
150 authentic digital images
155 modem
165 mass storage unit
170 received image
180 monitor
190 printer
200 developed images
230 order form
235 authorization code
240 order form file
250 receiving agency
260 selected receiving agency
300 order form
310 mass storage unit
320 order
330 printed postage stamps
340 fulfilled order
350 credit card charge
360 customer address
370 stamp transaction

What is claimed is:

1. A method of authorizing the making of postage stamp images on a receiver by a receiving agency comprising the steps of:
    (a) electronically transmitting a digital image file over a channel to the receiving agency;
    (b) the digital image file includes at least one digital image and authorization information for making postage stamp images on a receiver; and
    (c) receiving the digital image file at the receiving agency, displaying at least one received digital image and examining the displayed digital image to determine whether its contents are acceptable for making postage stamp images and examining the authorization information and printing at a designated location that accepts digital images on a receiver corresponding to the transmitted digital image when the authorization information is approved.

2. The method of claim 1 wherein the transmitted digital image is converted by a display to a visual image which is viewed to determine if it is acceptable.

3. The method of claim 1 wherein the authorization information is examined by logic and control means to determine that whether or not the authorization information is approved.

4. The method of claim 1 wherein the images are printed by a thermal printer, electrophotographic printer, ink jet or photographic printer.

5. The method of claim 1 wherein the digital image and the authorization information is transmitted over the Internet.

* * * * *